United States Patent [19]

Rempel et al.

[11] Patent Number: 4,582,690
[45] Date of Patent: Apr. 15, 1986

[54] OXIDATION OF POLYTHIONATES

[75] Inventors: Garry L. Rempel, Waterloo, Canada; Manas Chanda, Bangalore, India

[73] Assignee: University of Waterloo, Waterloo, Canada

[21] Appl. No.: 638,105

[22] Filed: Aug. 6, 1984

[51] Int. Cl.$^4$ .............................................. C01G 3/10
[52] U.S. Cl. ................................. 423/36; 210/762; 210/763; 423/45; 423/544; 423/577
[58] Field of Search .................. 423/36, 45, 522, 544, 423/577; 210/762, 763

[56] References Cited

U.S. PATENT DOCUMENTS

| | | | |
|---|---|---|---|
| 3,029,202 | 4/1962 | Brown | 210/763 |
| 3,186,942 | 6/1965 | Benger | 210/763 |
| 3,865,744 | 2/1975 | Parker et al. | 423/45 |
| 3,878,071 | 4/1975 | Selby et al. | 423/36 |
| 3,957,062 | 5/1976 | Johnson et al. | 423/36 |
| 3,962,073 | 6/1976 | Yoshikawa et al. | 210/763 |
| 4,029,578 | 6/1977 | Turk | 210/763 |
| 4,070,183 | 1/1978 | Parker et al. | 423/547 |

FOREIGN PATENT DOCUMENTS

| | | | |
|---|---|---|---|
| 0937690 | 11/1973 | Canada | 210/763 |
| 1071837 | 2/1980 | Canada | 423/544 |
| 2419496 | 11/1974 | Fed. Rep. of Germany | 210/762 |
| 48-84464 | 11/1973 | Japan | 210/762 |
| 0108462 | 8/1979 | Japan | 210/762 |
| 0022367 | 2/1980 | Japan | 423/45 |
| 1319619 | 6/1973 | United Kingdom | 210/763 |

Primary Examiner—John F. Niebling
Assistant Examiner—Terryence Chapman
Attorney, Agent, or Firm—Sim & McBurney

[57] ABSTRACT

Thiosalts contained in waste streams are oxidized to sulfate ions in the presence of sulfur-bound copper. Air oxidation of the waste stream is effected in a slurry of the copper compound, which may be CuS, Cu$_2$S or chalcopyrite, and continuous long term operation is possible without loss of catalytic activity and without catalyst degradation.

11 Claims, 8 Drawing Figures

OXIDATION OF POLYTHIONATES

FIELD OF INVENTION

The present invention relates to the treatment of water streams containing thiosalts.

BACKGROUND TO THE INVENTION

Partially oxidized sulfur oxyanions, such as, thiosulfate ($S_2O_3^{2-}$), tetrathionate ($S_4O_6^{2-}$) and trithionate ($S_3O_6^{2-}$), which are collectively known as thiosalts, are formed during the milling and flotation processing of sulfide ores. These residual constituents in mill tailings waters are converted into sulphuric acid by bacterial action at a sufficiently rapid rate as to result in an environmental problem when the tailings are discharged into river systems.

Complete oxidation of the thiosalts to sulfuric acid by chemical or biochemical means and neutralization of the acid by lime prior to discharge of the effluent to receiving streams has long been considered a viable solution to the problem, provided that a simple and economic means of oxidation of thiosalts in large volumes of water can be developed. To this end, the possibility of using catalyzed oxidation of the thiosalts by air to sulfate has been the subject of active research, ever since the finding that suitably complexed copper (II) ions homogeneously catalyze the oxidation of thiosulfate to sulfate by molecular oxygen, as described by Byerley et al in J. Chem. Soc., Dalton Trans. 1975, 1329. Research efforts were directed at developing polymer-supported catalysts having this property, since the provision of a supported catalyst would facilitate economic recovery and reuse of the catalyst and, in this way, provide a potentially low cost method for the removal of thiosalts.

Following the preparation and testing of a number of polychelates for their catalytic activity, poly(4-vinyl pyridine)-Cu(II) complexes were developed as effective catalysts, as described by Chanda et al. in J. Molecular Catal. 1980, 7, 389 and in J. Molecular Catal. 1981, 11, 9. Subsequent attempts to improve the activity and stability of these PVP-CU(II) catalysts succeeded in developing a PVP-CU(II) complex of optimum composition based on a quantitative understanding of the relation between catalytic activity and distribution of different coordinate species of the polychelate (See Chanda et al. J. Molecular Catal. 1980, 61, 533). Further enhancement of activity and stability of the complex were achieved by cross-linking quaternization of the residual free pyridine units in the complex of optimum composition (Chanda et al., J. Molecular Catal. 1981, 12, 197).

Although the polymer-supported Cu(II) catalysts exhibited high activity and stability during batch oxidation runs lasting a few hours, continuous oxidation runs conducted over several weeks using slurry reactors and air as both the source of oxygen and agitation means for the slurry, resulted in a slow deactivation of the catalyst with time due to leakage of copper ions and slow degradation of the polymer base (Chanda et al., Final Report (Oct. 1980) on Energy, Mines and Resources Canada Research Agreements Program Nos. 274-2-78, 56-2-79 and 54-2-80).

SUMMARY OF INVENTION

It has now surprisingly been found that sulfur-bonded copper is catalytically active for thiosalt oxidation by molecular oxygen and does not undergo any significant degradation, thereby permitting the same to be used for long term oxidation treatment of thiosalts. In accordance with the present invention, therefore, there is provided a method for the treatment of water streams containing thio salts by oxidizing thethio salts to sulphate by molecular oxygen in the presence of a heterogeneous comprising a sulfur-bonded copper compound, i.e., a copper compound having sulfur atoms directly bonded to the copper atoms.

Conversion of the thiosalts to sulphate ions, in accordance with the process of the invention, produces a stream which can now be treated simply, with lime or similar treatment agent, to neutralize and remove the sulphate ions.

GENERAL DESCRIPTION OF INVENTION

Figure 1:
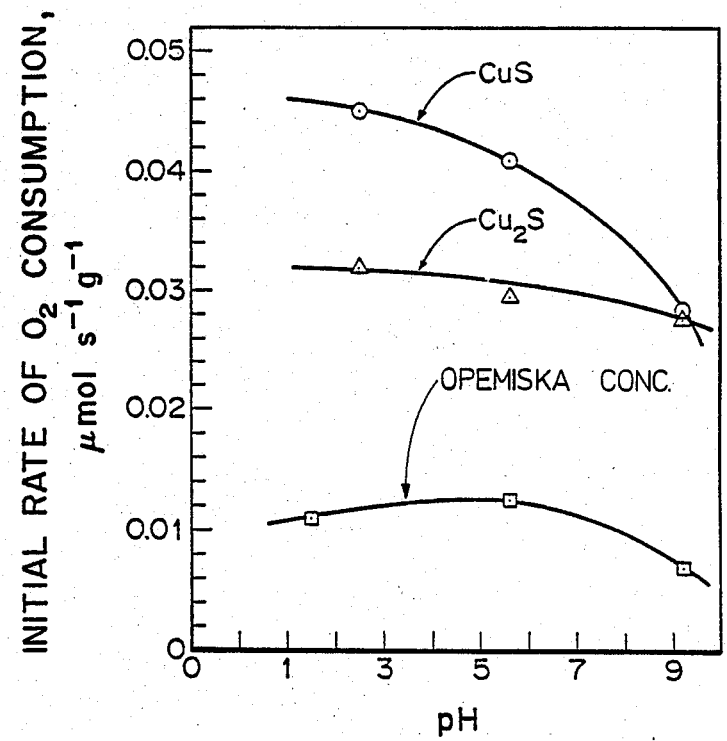
FIG. 1 shows a graphical representation of the effect of pH of reaction medium on the rate of oxygen consumption in the oxidation of $S_2O_3^{2-}$ (20 mmol/l) with air (98.6 kPa) at 50° C. catalyzed by CuS, Cu$_2$S and Opemiska concentrate used as 4%, 4% and 8% w/v aqueous slurry, respectively.

The water streams containing thiosalts treated in accordance with this invention usually arise as the tailings stream from the milling of sulfide ores, although any other water body containing such salts may be treated by the process of this invention. As noted earlier, the thiosalts are partially oxidized sulfur oxyanions and may be represented generally as $S_xO_y^{2-}$ where $x \geq 2$ and $y \geq 3$, with $y > x$. Usually x is 2, 3 or 4 and y is 3 or 6, with the specific species being $S_2O_3^{2-}$, $S_4O_6^{2-}$ and $S_3O_6^{2-}$.

The sulfur-bonded copper compound which is used in the oxidation treatment of the present invention usually is CuS, $Cu_2S$ or the naturally-occurring complex chalcopyrite ($CuFeS_2$), although other synthetic or naturally-occurring materials which contain sulfur-bonded copper compounds may be used. CuS is somewhat difficult to prepare and rare in nature and hence is less preferred. However, $Cu_2S$ is readily available as a common by-product of copper smelting and chalcopyrite concentrates are readily prepared from appropriate naturally-occurring ore bodies. Some activity variations have been observed between sources of the chalcopyrite concentrates. The copper compounds may be used in any desired form in the process of the invention, usually as a slurry of particulate solids in the water stream being treated.

The process of the invention may be effected over a wide temperature range and usually mildly elevated temperatures in the range of about 20° to about 90° C., preferably about 30° to about 60° C. An oxygen-containing gas, usually air, is bubbled through the slurry to provide the oxidizing gas and to maintain the slurry under agitation. The process may be effected on a continuous basis for extended periods of time without any loss of catalytic activity of the copper compound and thereby avoiding the necessity for any catalyst regeneration treatment. The prior art problems of catalyst deactivation and polymer degradation do not result in this invention.

The oxidation process preferably is effected over the range of acid or neutral pH values, since the reaction rate drops rapidly at pH values above 7. Usually the pH is in the range of about 3 to about 6.

The oxidation process of the invention may be effected in batch manner or, preferably, as a continuous process, since the particular catalysts which are used herein have long term effectiveness and do not exhibit any significant degradation.

Following oxidation of the thiosalts to sulphate, the sulphate may be removed from the waste stream by any convenient treatment, for example, treatment with lime. Lime treatment also serves to remove any copper and/or iron which may have leaked from the catalyst during the oxidation process as a result of catalyst degradation.

EXAMPLES

In the following Examples, the determinations of concentrations of $S_2O_3^{2-}$ and $S_4O_6^{2-}$ were carried out photometrically using the method of Mizoguchi et al described in Bull. Chem. Soc. Japan, 1975, 48, 1799. Sulfate in the presence of $S_2O_3^{2-}$ and $S_4O_6^{2-}$ was analyzed following the procedure given by Rolia et al. in Rep MRP/MSL 79-70 (J) May 1979 (Energy, Mines and Resources, Canada). The concentration of metal ions in solution as a result of leakage was determined by atomic absorption spectroscopy.

EXAMPLE 1

A study was undertaken of the product distribution pattern and kinetics of oxidation of the two predominant thiospecies, namely, thiosulfate and tetrathionate, using CuS, $Cu_2S$ and chalcopyrite concentrates from several sources as catalysts and air as the oxidizer. The chalcopyrite tested was from four different sources, namely, Opemiska chalcopyrite concentrate (24.9% Cu, 28.5% Fe) from Falconbridge Copper, Chalcopyrite concentrate (26.5% Cu, 21.7% Fe) from Bethlehem Copper Corporation Ltd., chalcopyrite concentrate (31.2% Cu, 23.0% Fe) from Lornex Mining Corporation Ltd., and chalcopyrite mineral (26.1% Cu, 36.6% Fe) from Montana, U.S.A.

Details of the various experiments and the results obtained are as follows:

(a) The effect of pH on the air oxidation of $S_2O_3^{2-}$ catalyzed by CuS, $Cu_2S$ and pyritic copper ore was studied by measuring the initial rate of oxygen consumption at different pH levels. The results obtained are presented in FIG. 1. As may be seen from the results shown in FIG. 1, lowering the pH increases the rate of oxidation of both CuS and $Cu_2S$, with the effect being more marked for $Cu_2S$. On the chalcopyrite concentrate, the optimum pH range for oxidation was found to be about 3 to 6. In all cases, the oxidation rate fell rapidly above pH 7.

Figure 2:
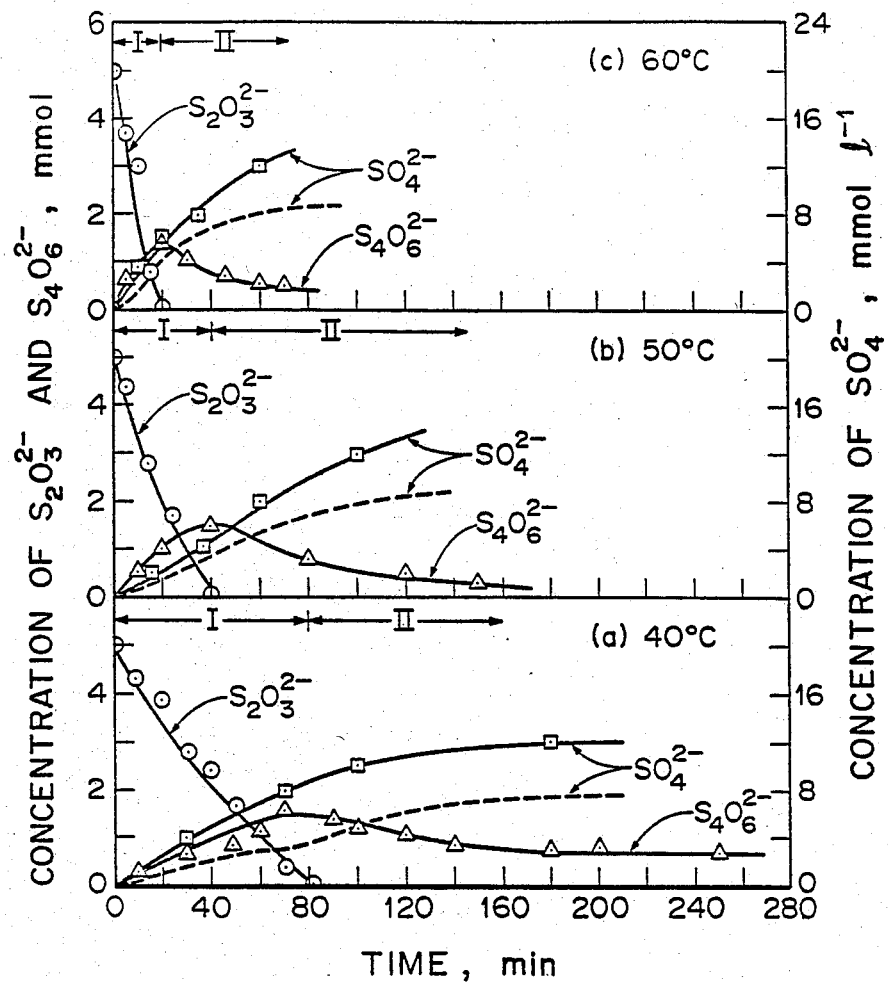
FIG. 2 shows graphical representations of the variation of concentration of thiosalt species in the air oxidation of $S_2O_3^{2-}$ (5 mmol/l) on CuS (4% w/v aq. slurry) in a batch reactor at (a) 40° C., (b) 50° C. and (c) 60° C. with the dotted line showing $SO_4^{2-}$ calculated from thiosalt balance.
Figure 3:
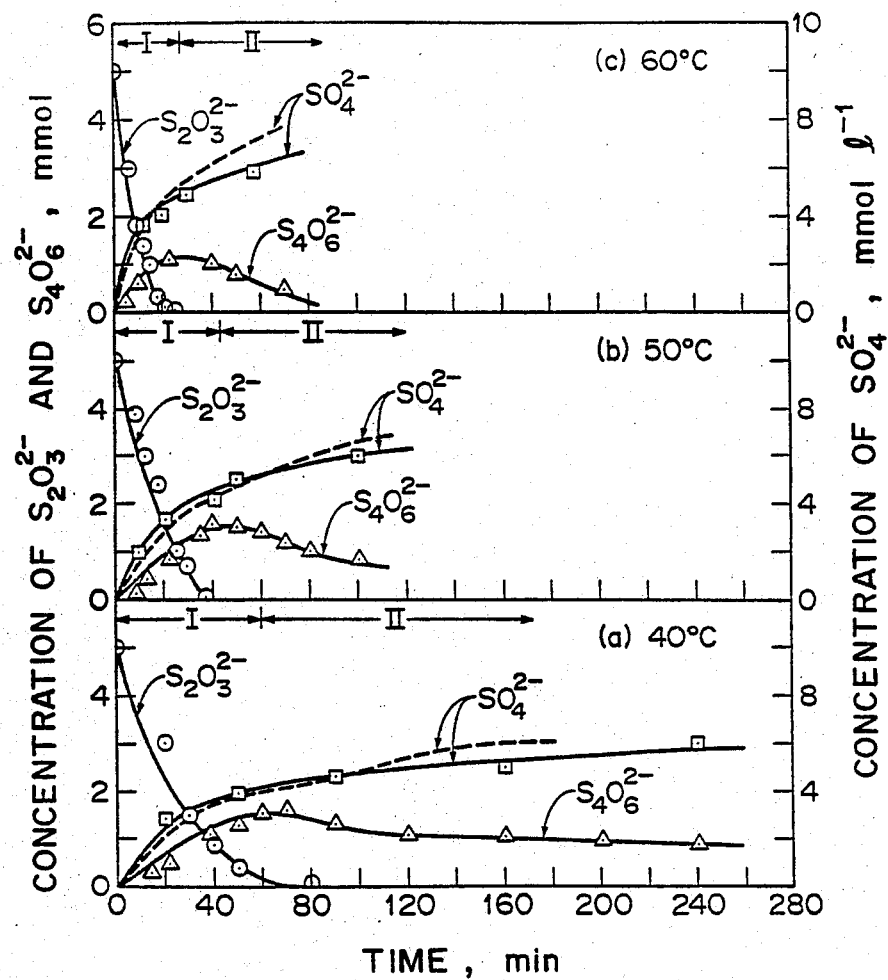
FIG. 3 shows graphical representations of the variation of concentration of thiosalt species in the air oxidation of $S_2O_3^{2-}$ (5 mmol/l) on Cu$_2$S (4% w/v aq. slurry) in a batch reactor at (a) 40° C., (b) 50° C. and (c) 60° C. with the dotted line showing $SO_4^{2-}$ calculated from thiosalt balance.

(b) The product distribution pattern was determined for CuS and $Cu_2S$ as the catalyst species. The major sulfur containing species formed during air oxidation of $S_2O_3^{2-}$ were found to be $S_4O_6^{2-}$ and $SO_4^{2-}$. No trithionite ($S_3O_6^{2-}$) was found. The product distribution patterns obtained using 4% (w/v) CuS slurry at 40°, 50° and 60° C. are graphically illustrated in FIG. 2 and those with $Cu_2S$ in FIG. 3. It is evident from the product distribution pattern shown in FIGS. 2 and 3 that, in the presence of both CuS and $Cu_2S$, $S_2O_3^{2-}$ is oxidized by air to $S_4O_6^{2-}$ and $SO_4^{2-}$ by parallel reaction paths and $S_4O_6^{2-}$ is further oxidized to $SO_4^{2-}$.

(c) The product distribution pattern was determined for chalcopyrite concentrates from four sources. Of them, only the Opemiska and Bethlehem chalcopyrite concentrates were found to be capable of complete oxidation of $S_2O_3^{2-}$ to $SO_4^{2-}$. Both Lornex chalcopyrite and chalcopyrite mineral, which showed mildly alkaline pH when slurried in water, were found to promote the formation of stable trithionate ($S_3O_6^{2-}$) from the intermediate product ($S_4O_6^{2-}$) resulting in incomplete oxidation. No trithionate was observed in air oxidation of $S_2O_3^{2-}$ with Opemiska and Bethlehem chalcopyrite concentrates, both of which exhibited mildly acid pH in aqueous slurry.

Figure 4:
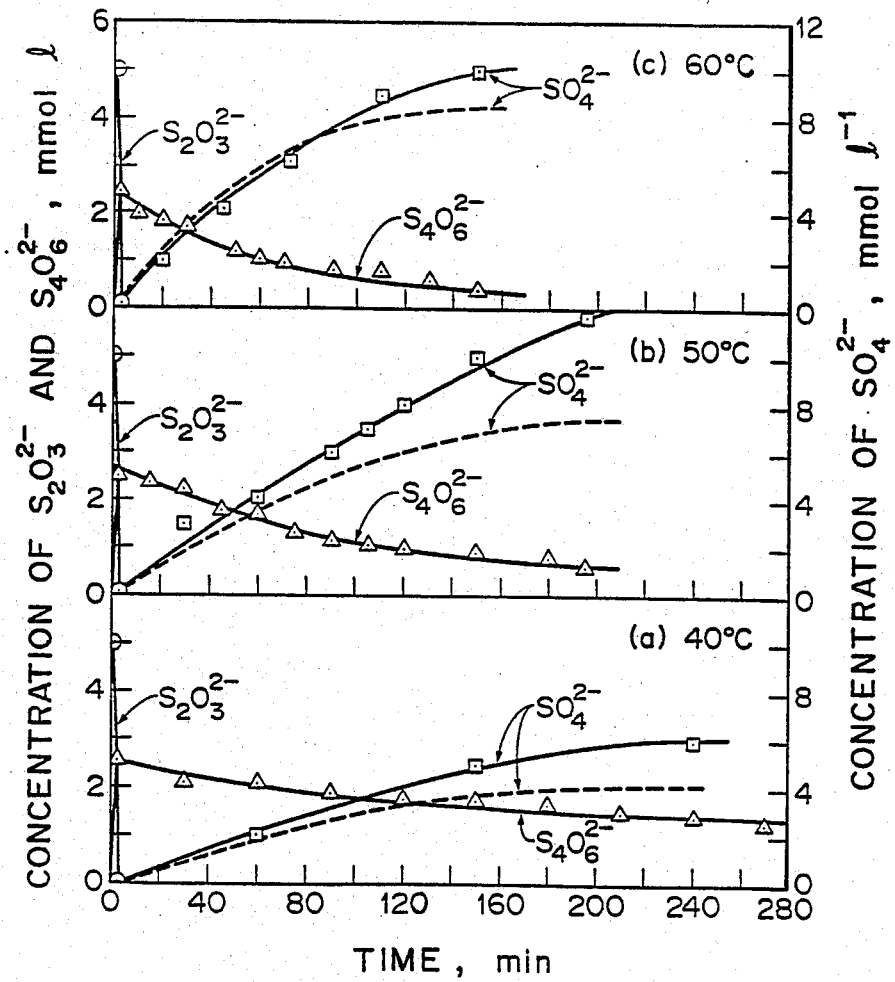
FIG. 4 shows graphical representations of the variation of concentration of thiosalt species in the air oxidation of $S_2O_3^{2-}$ (5 mmol/l) on Opemiska chalcopyrite concentrate (8% w/v aq. slurry) in a batch reactor at (a) 40° C., (b) 50° C. and (c) 60° C. with the dotted line showing $SO_4^{2-}$ calculated from thiosalt balance.
Figure 5:
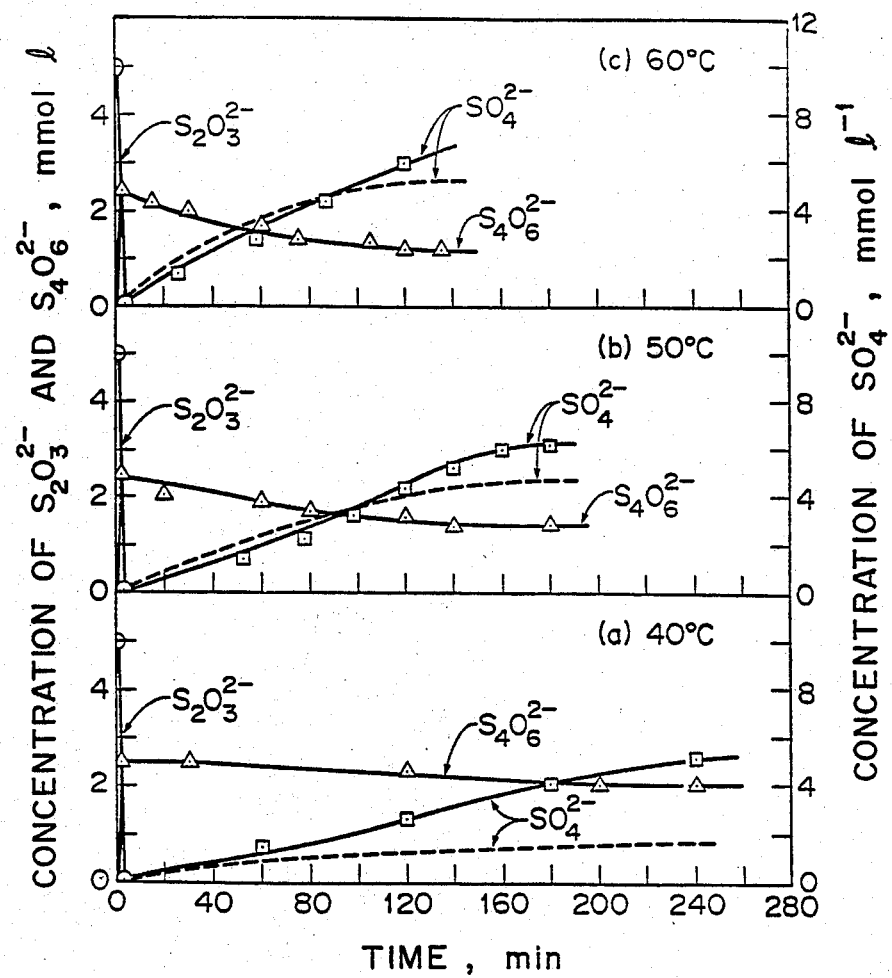
FIG. 5 shows graphical representations of the variation of concentration of thiosalt species in the air oxidation of $S_2O_3^{2-}$ (5 mmol/l) on Bethlehem chalcopyrite concentrate (8% w/v aq. slurry) in a batch reactor at (a) 40° C., (b) 50° C. and (c) 60° C. with the dotted line showing $SO_4^{2-}$ calculated from thiosalt balance.

The product distribution patterns obtained from air oxidation of $S_2O_3^{2-}$ with 8% (w/v) slurry of Opemiska chalcopyrite concentrate are shown graphically in FIG. 4 and that with 8% (w/v) slurry of Bethlehem chalcopyrite concentrate in FIG. 5. As may be seen, $S_2O_3^{2-}$ is rapidly and quantitatively converted to $S_4O_6^{2-}$ which, in turn, undergoes air oxidation to $SO_4^{2-}$.

Figure 6:
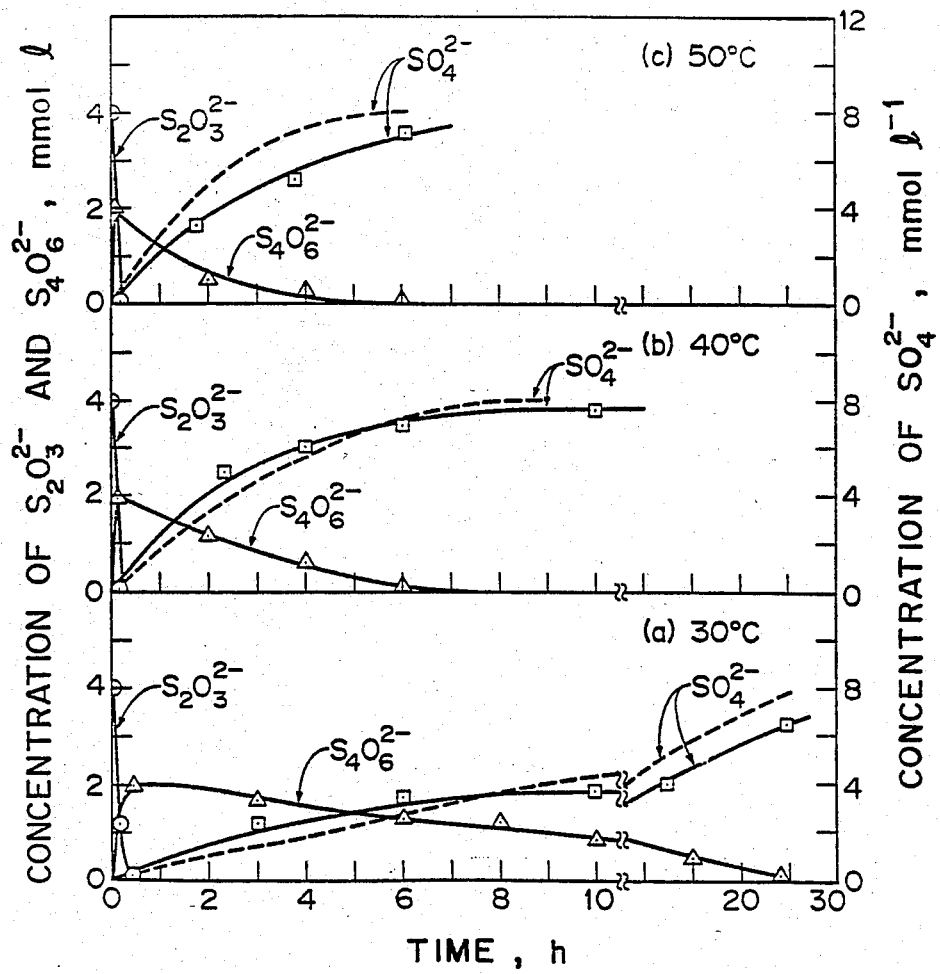
FIG. 6 shows graphical representations of the variation of concentration of thiosalt species in the air oxidation of $S_2O_3^{2-}$ (5 mmol/l) on Opemiska chalcopyrite concentrate (15% w/v aq. slurry) in a batch reactor at (a) 30° C., (b) 40° C. and (c) 50° C. with the dotted line showing $SO_4^{2-}$ calculated from thiosalt balance.
Figure 7:
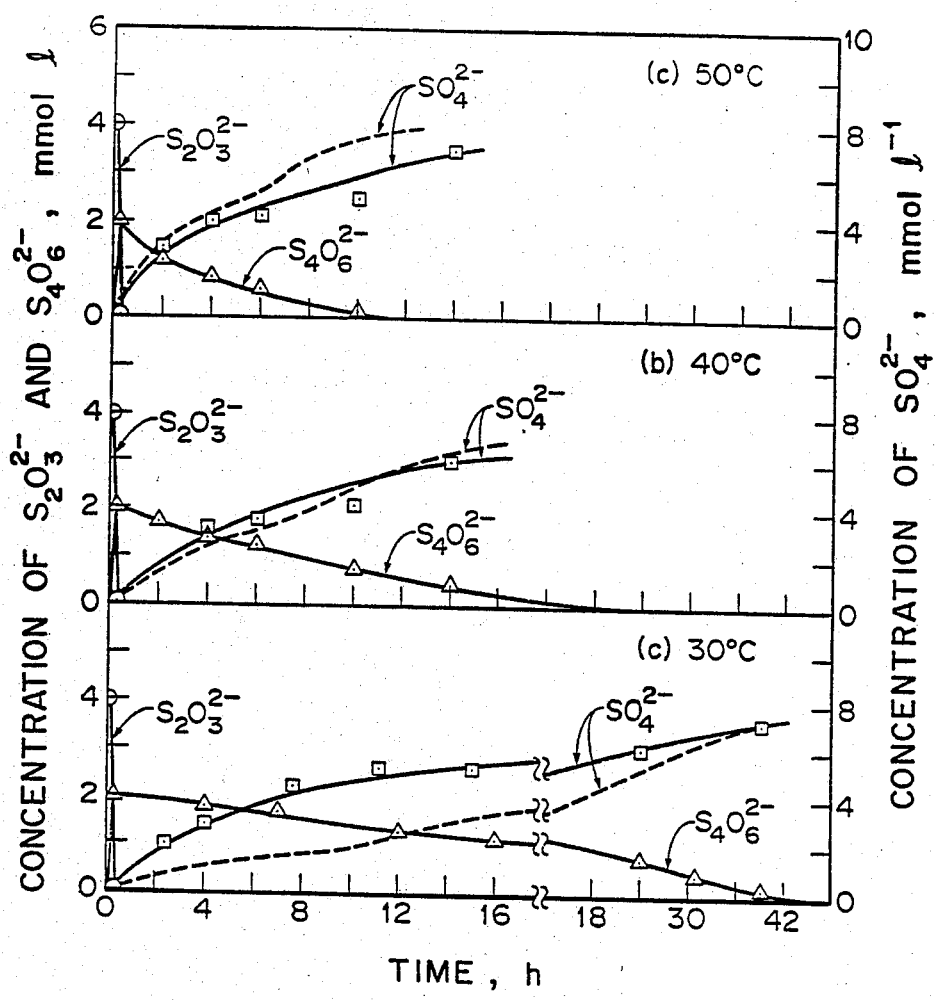
FIG. 7 shows graphical representations of the variation of concentration of thiosalt species in the air oxidation of $S_2O_3^{2-}$ (5 mmol/l) on Bethlehem chalcopyrite concentrate (15% w/v aq. slurry) in a batch reactor at (a) 30° C., (b) 40° C. and (c) 50° C. with the dotted line showing $SO_4^{2-}$ calculated from thiosalt balance.

(d) To achieve complete oxidation of thiospecies to $SO_4^{2-}$ in a reasonable period of time, oxidation runs were conducted with higher loadings of chalcopyrite concentrate. The results obtained are depicted graphically in FIGS. 6 and 7 for 15% (w/v) slurries of Opemiska and Bethlehem chalcopyrite concentrates respectively. As may be seen therefrom, a 4 mmol/l thiosulfate feed (450 ppm $S_2O_3^{2-}$) was completely converted to $SO_4^{2-}$ by air oxidation with a 15% (w/v) slurry of Opemiska chalcopyrite concentrate in 24, 9 and 5 hours at 30°, 40° and 50° C., respectively. The corresponding figures for Bethlehem chalcopyrite concentrate were 46, 22 and 12 hours, respectively.

EXAMPLE 2

Figure 8:
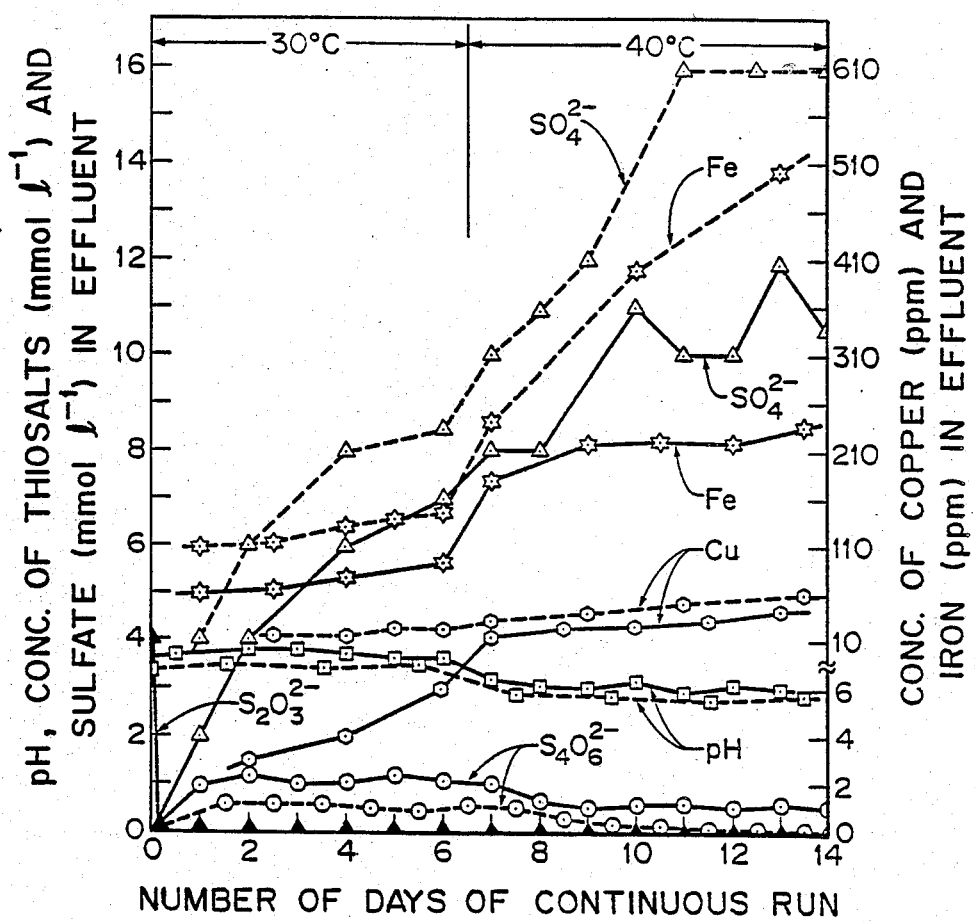
FIG. 8 shows a graphical representation of the performance of an assembly of two series-connected 12 l slurry reactors with Opemiska chalcopyrite concentrate (in reactor No. 1) and Bethlehem chalcopyrite concentrate (in reactor No. 2) as catalysts at a slurry concentration of 6% w/v for air oxidation of thiosalts in a solution of 4 mmol/l thiosulfate (450 ppm $S_2O_3^{2-}$) at 30° C. and 40° C., at a flow rate of 250 ml/hr, with the solid lines representing effluent from reactor No. 1 and the dotted lines representing effluent from reactor No. 2.

Oxidation runs were performed continuously over several weeks using catalyst slurry in stirred tank reactors. The results of continuous air oxidation runs for about two weeks on a thiosulfate solution of concentration 4 mmol/l (450 ppm $S_2O_3^{2-}$) fed to the first reactor for Opemiska and Bethlehem chalcopyrite concentrates were plotted graphically and appear as FIG. 8. During these runs, the temperature of the slurry was increased from 30° to 40° C. after one week of continuous run to study the effect of temperature on thiosalt removal and metal ion leakage. The pH of the slurry in the first reactor remained in the ranges 3.6 to 3.8 at 30° C. and 2.9 to 3.1 at 40° C., while in the second reactor, the pH levels were 3.4 to 3.5 at 30° C. and 2.8 to 3.0 at 40° C.

There was no $S_2O_3^{2-}$ present in the effluent from either the first or second reactor while the $S_4O_6^{2-}$ levels in the effluents from the two reactors remained steady, indicating stability of the catalyst systems. Longer continuous runs have been conducted for about 1 month, showing no loss of catalyst activity.

The leakage of copper from the Opemiska chalcopyrite concentrate was found to be low (2 to 6 ppm) at 30° C. but increased to 20 to 40 ppm at 40° C. The leakage of copper from the Bethlehem chalcopyrite concentrate was comparatively higher, being 10 to 20 ppm at 30° C. and 35 to 60 ppm at 40° C. In addition, the leakage of iron from Bethlehem chalcopyrite concentrate (about 500 ppm at 40° C.) was also significantly higher than that from the Opemiska chalcopyrite concentrate (about 200 ppm at 40° C.).

SUMMARY OF DISCLOSURE

In summary of this disclosure, the present invention provides an improved method of treatment of water streams containing the thiosalts to remove the same therefrom by oxidizing the thiosalts to sulphate using a sulfur-bonded copper compound as the oxidation catalyst. Modifications are possible within the scope of this invention.

What we claim is:

1. A process for the treatment of partially oxidized sulfur oxyanions of the formula $S_xO_y^{2-}$ wherein x is greater than or equal to 2, y is greater than or equal to 3 and y is greater than x, which comprises oxidizing said oxyanions in the presence of a heterogeneous catalyst comprising a copper compound having sulfur atoms directly bonded to copper atoms, under neutral or acid conditions.

2. The process of claim 1 wherein said copper compound is CuS.

3. The process of claim 1 wherein said oxidation is effected in an aqueous slurry of the copper compound through which air is passed as the oxidizing gas.

4. The process of claim 3 wherein said oxidation is effected at an acid pH value.

5. The process of claim 4 wherein said acid pH value is in the range of about 3 to about 6.

6. The process of claim 3 effected at a temperature of about 20° to about 90° C.

7. The process of claim 3 carried out continuously.

8. A process for the treatment of partially-oxidized sulfur oxyanions of the formula $S_xO_y^{2-}$ wherein x is greater than or equal to 2, y is greater than or equal to 3 and y is greater than x, which comprises oxidizing said oxyanions in the presence of a catalyst comprising a sulfur-bound copper compound which is $Cu_2S$.

9. A process for the treatment of partially oxidized sulfur oxyanions of the formula $S_xO_y^{2-}$ wherein x is greater than or equal to 2, y is greater than or equal to 3 and y is greater than x, which comprises oxidizing said oxyanions in the presence of a heterogeneous catalyst comprising a sulfur-bound copper compound which is a chalcopyrite concentrate.

10. The process of claim 9 wherein said chalcopyrite concentrate is one which forms an acidic aqueous slurry on slurrying in water.

11. In a process for the treatment of a thiosalts-containing tailings stream from the milling of sulfide ores by an oxidizing gas to convert such thiosalts to sulfate ions, the improvement which comprises catalyzing the oxidizing treatment using a heterogeneous catalyst comprising a copper compound having sulfur atoms directly bonded to copper atoms under neutral or acid conditions.

* * * * *